May 26, 1942. H. SEEGERS ET AL 2,284,234
GAUGE CONSTRUCTION
Filed Nov. 3, 1938
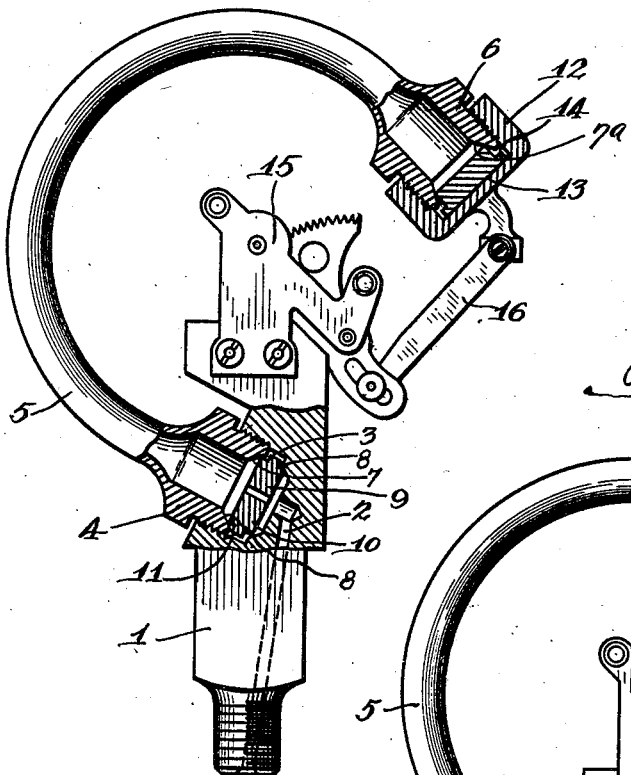
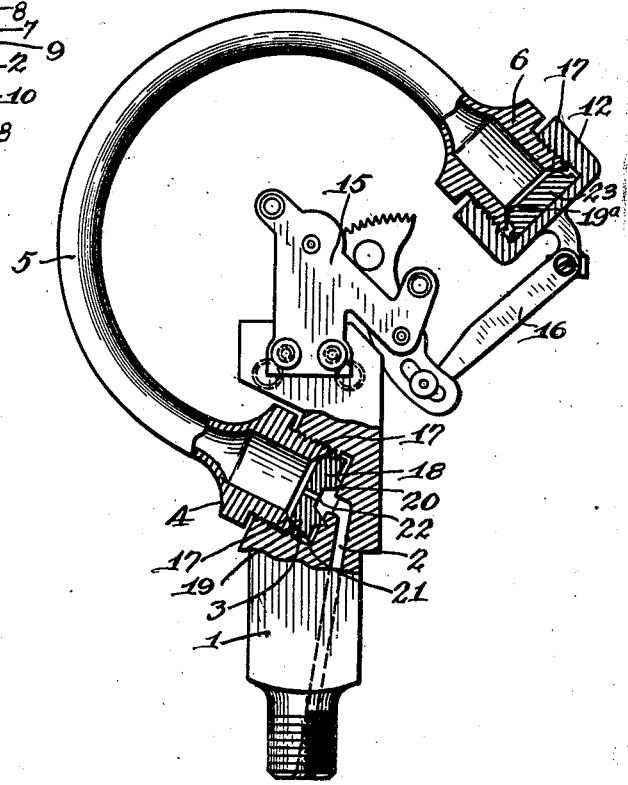
Inventors:
Hans Seegers
Willard L. Pollard Patented May 26, 1942

2,284,234

UNITED STATES PATENT OFFICE 2,284,234

GAUGE CONSTRUCTION

Hans Seegers, Chicago, and Willard L. Pollard, Evanston, Ill., assignors to Jas. P. Marsh Corporation, Chicago, Ill., a corporation of Illinois Application November 3, 1938, Serial No. 238,566

4 Claims. (Cl. 285—157)

This invention relates to gauge construction and more particularly to pressure gauges of the Bourdon tube type, in which the Bourdon tube is mounted on, and sealed in a suitable support, having a pressure passage therein whereby a continuous duct is provided through the support and communicates with the Bourdon tube. Pressure gauges of this type are usually provided with a post or stem on which the case is mounted and to which one end of the Bourdon tube is sealed. The opposite end of the tube is sealed by any suitable means and a link mechanism is provided whereby the indicator mechanism, which also may be mounted on the post, is operated automatically by the Bourdon tube to indicate pressures in any pressure system to which the gauge may be connected.

It is an object of the present invention to provide a new and novel sealing means whereby the free end of the Bourdon tube may be sealed and the opposite end may be inserted into and sealed in the gauge post or other support in a manner to form a rigid tube support and seal and effectively prevent leakage.

The gauge posts are usually provided with a longitudinal passage communicating with a so-called socket at the upper end which is preferably angularly disposed so that, when the end of the Bourdon tube is threaded therein, the tube will be supported in a proper position for control of the indicating mechanism. The threaded end of the Bourdon tube is preferably of hardened steel, while the post into which the tube is to be threaded is ordinarily of soft steel or brass. At least it is usually of material considerably softer than the threaded end of the Bourdon tube. It has, therefore, been a considerable problem to effectively seal the connection against high pressures and to prevent leaks which may be due, in part at least, to changes in temperature and contraction and expansion of the different materials of the connecting portions.

It is particularly desirable to provide an effective seal without the application of high temperatures such as are necessary in welding or brazing.

It is an object of the invention to provide an improved sealing device of the so-called floating type in which it is only necessary to insert the sealing member and threaded end of the Bourdon tube snugly into the socket, whereby the sealing member automatically is adjusted and clamped therein to provide annular sealing contacts and at the same time exert an outward pressure on the inner end of the Bourdon tube, whereby the threaded portion tends to expand and still more effectively seal the connection.

Further objects and advantages of the invention will be apparent from the specification and the appended claims.

In the drawing:

Figure 1 is a front elevation of a gauge operating mechanism including the Bourdon tube and support and a portion of the operating mechanism controlled thereby, portions being shown in section for purposes of illustration; and Fig. 2 is a similar view but discloses a slightly different embodiment of the invention.

The casing for the device may be of the usual type and is not shown.

The embodiment illustrated in Fig. 1 comprises a post 1 which may be of the usual type and which ordinarily supports the gauge casing. This post may be threaded at its lower end and provided with a longitudinal fluid duct or channel 2 communicating with a threaded socket opening 3 which may be angularly positioned as shown adjacent the upper end of the post to receive the threaded end 4 of a Bourdon tube 5. The opposite end 6 of the Bourdon tube 5 may be identical with the end 4 and similarly threaded as shown. The ends 4 and 6 of the tube are preferably of hardened steel and sufficiently rigid to provide suitable coupling members. The open end of the tube is counterbored to provide an annular conical surface 7 whereby the coupling member 4 is considerably thinner adjacent its open end than through the side walls of the member. The socket 3 is also countersunk to provide an annular conical surface 8 which may be of substantially the same diameter as the conical surface 7.

A disc-like sealing member 9 having a restricted opening 10 therethrough is inserted in the socket, and this disc is also preferably of hardened steel and of such diameter that its opposite annular edges engage the opposed conical surfaces 7 and 8 as shown. When the end 4 of the Bourdon tube is snugly threaded into the socket, the opposed conical surfaces engage the sharp annular corners of the sealing disc 9 in annular line contact therewith, and it will be apparent that, if the Bourdon tube is threaded into the socket with sufficient force, the floating member 9 will automatically adjust itself to the conical surfaces and an effective annular seal will be provided.

An important feature of the invention is not only to provide an effective seal at the annular line contact, but also to cause the thin inner end of the threaded portion 4 to be pressed outwardly whereby the threads are forced snugly together to provide a still more efficient seal. This is accomplished by means of the annular surface 7 which tends to expand the inner end of the coupling portion 4 as the coupling is tightened.

The sealing disc 9 may be provided with an annular flange 11 which is only slightly smaller in diameter than the socket 3. The sealing member will, therefore, be substantially centered merely by inserting it in the socket. The free end 6 of the Bourdon tube may be identical in structure with the end 4 and also be provided with an annular conical surface 7a. With this construction, the ends of the tubes are interchangeable in so far as the coupling and sealing members are concerned and the free end is provided with a threaded cap 12 for closing the end of the tube. A disc-like sealing member 13 may be inserted in the cap 12 and the sharp annular edges of this disc will engage the conical surface 7a in an annular line contact and effectively seal the opening and at the same time tend to expand the end of the tube and thereby assist in sealing the threads. This member 13 may also be provided with an annular flange-like portion 14 whereby it is substantially centered in the cap 12. An indicator operating mechanism indicated generally by the reference character 15 may be mounted on the post 1 and this mechanism may be operatively connected to a cap by means of a link 16.

Fig. 2 illustrates another embodiment of the invention in which the post 1 and cap 12 may be substantially identical with those shown in Fig. 1 and the cap 12 may be connected to the mechanism 15 by means of a link 16 in the same manner as previously described. In this embodiment the connector portions 4 and 6 at each end of the Bourdon tube 5 may be identical and each open end is countersunk at 17 to provide an annular conical surface, as shown. A disc-like sealing member or plug 18 may be positioned within the socket 3, as shown, and the outer corners of this disc-like plug are preferably arcuate or rounded as shown at 19, whereby these rounded corners are engaged by the conical surface 17 adjacent the outer periphery of the conical surface. The engagement at this point where the wall is thinnest tends to expand the threads outwardly into more intimate contact and thereby provide an effective seal at the threads as well as at the annular line of contact of the counter-sunk surface with the rounded corners of the sealing member.

The opposite side of the sealing disc 18 is provided with a tapered annular flange 20 which provides an annular knife edge engagement against the bottom of the socket. This flange is preferably smaller in diameter than the contacting corners of the opposite side of the disc and, therefore, the disc tends to be self-adjusting and to provide snug annular contact at all sealing surfaces. The disc may be provided with an annular lateral flange 21 which is only slightly smaller in diameter than the socket opening, whereby the disc will be substantially centered therein and its sealing position will automatically be adjusted for proper sealing when the Bourdon tube is threaded into the socket. The disc 18 is provided with a restricted opening 22 which is effective to prevent sudden fluctuations of the mechanism in the same manner as the passage 8 in Fig. 1.

The opposite end of the Bourdon tube may be sealed in a similar manner and with a disc 23 which may be similar to the disc 18 except that the annular knife edge flange 20 and passage 22 may be omitted so that the disc 23 rests against the flat bottom of the cap 12. The bushing, however, is provided with the same annular rounded corners as shown at 19a for sealing engagement with the conical surface 17, whereby a suitable annular seal is provided and these rounded corners tend to force the threads into more intimate engagement in the same manner as previously described.

Modifications may be made without departing from the spirit of the invention. It is desired, therefore, that the invention be limited only by the scope of the appended claims.

Having thus described this invention what is claimed and desired to be secured by Letters Patent is:

1. A sub-assembly for a pressure gauge comprising a supporting connector having an internally threaded socket with a substantially flat bottom wall, a Bourdon tube having an externally threaded countersunk end to provide a conical seat, a perforated disc-like sealing member having an annular knife-edge flange engaging said bottom wall and an annular portion, rounded in axial cross-section having annular line engagement with said conical seat.

2. A sub-assembly for a pressure gauge comprising a Bourdon tube having a thick walled externally threaded end, said end being countersunk to provide an annular conical surface whereby said tube terminates in a relatively thin edge portion, an internally threaded socket to receive said tube end, a sealing member having an annular edge wedged in annular linear sealing engagement with said conical surface whereby said thin tube edge tends to be expanded to seal said threads, and an annular knife-edge flange on said sealing member in annular linear sealing engagement with the bottom wall of said socket.

3. In a fluid pressure gauge of the Bourdon type having a spring tube resiliently operable to indicate pressure conditions and having a thick walled externally threaded end, the working passage terminating in a countersunk end to provide an annular conical surface with a relatively thin periphery, a coupling member having an internally threaded socket to receive said threaded end and having a substantially flat bottom wall, said member having a fluid passage for communication with said tube, a sealing disc having a passage therethrough and an annular sealing shoulder rounded in axial cross section wedged into said countersunk opening to provide an annular linear sealing contact adjacent the outer periphery of said conical surface, and a laterally extending knife-edge flange on said disc and in annular linear sealing engagement with said bottom wall.

4. A sealing member for a Bourdon tube, said tube having a passage terminating in a countersunk opening, a socket coupling member and means for forcing said tube snugly into said socket, said sealing member comprising a self centering disc only slightly smaller than the inside diameter of said socket for positioning in the bottom of said socket, an annular knife-edge flange on one side of said disc for line sealing engagement with the bottom of said socket, said disc having a rounded annular shoulder on its opposite side for sealing contact with said countersunk surface.

HANS SEEGERS.
WILLARD L. POLLARD.